June 13, 1961     C. R. COOLEY     2,988,429
SPIRAL CONTACTOR FOR SOLVENT EXTRACTION COLUMN
Filed Dec. 24, 1958
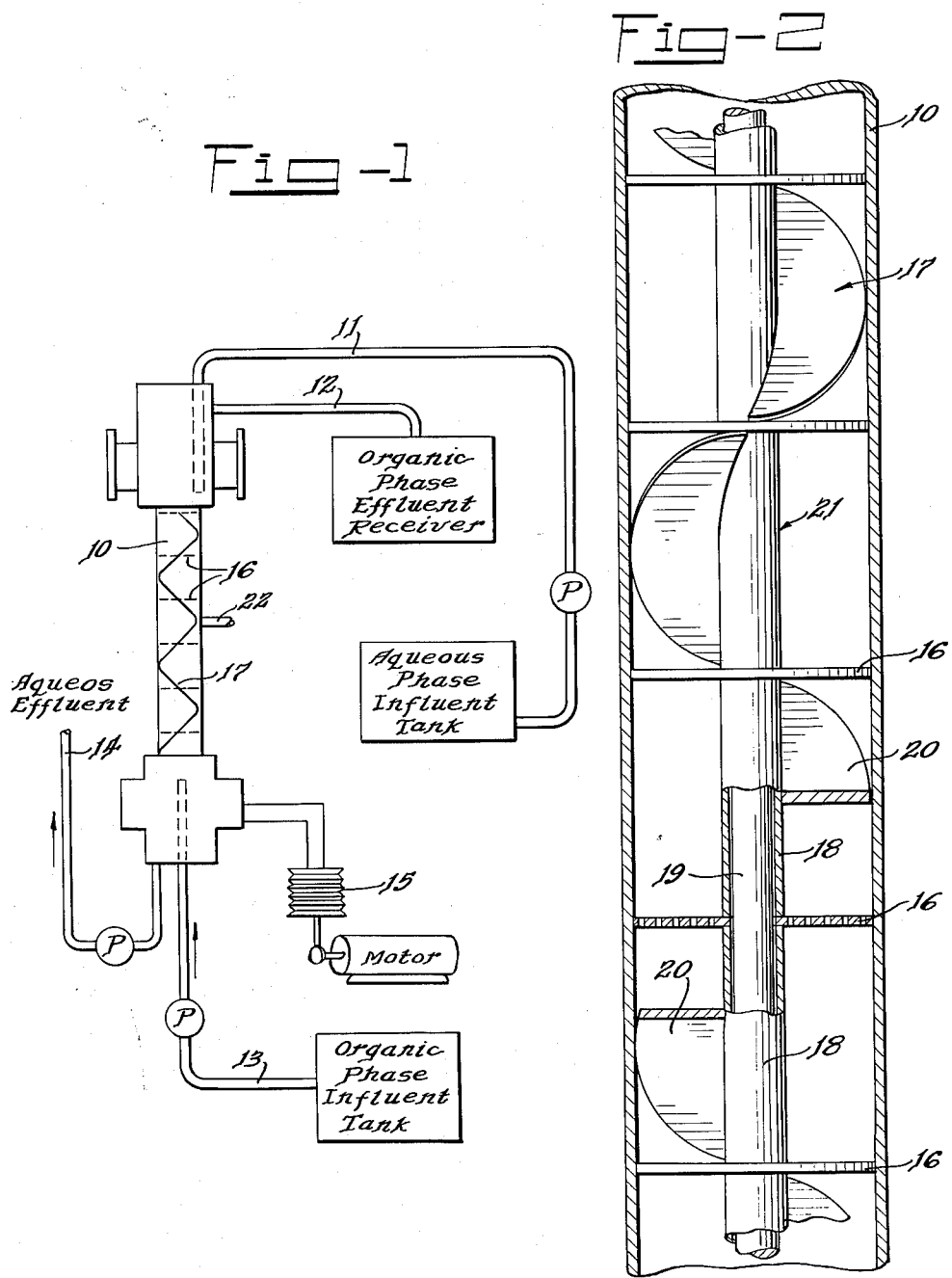
INVENTOR.
Carl R. Cooley
BY
Attorney

2,988,429
SPIRAL CONTACTOR FOR SOLVENT EXTRACTION COLUMN

Carl R. Cooley, Richland, Wash., assignor to the United States of America as represented by the United States Atomic Energy Commission
Filed Dec. 24, 1958, Ser. No. 782,983
2 Claims. (Cl. 23—270.5)

This invention relates to the removal of materials, such as metal values or impurities, from a liquid by means of another liquid brought into intimate contact with the first liquid and then separated therefrom. More specifically, the invention relates to counter-current extraction in a pulse column.

When radioactive materials are being acted upon, height of the column becomes of great importance because of the cost of shielding. Therefore it is important to reduce height of a column as much as possible while maintaining the efficiency of the column.

An object of the present invention is to shorten an extraction column without loss in efficiency. This object is accomplished by making the liquids follow a non-linear path that is longer than the ordinary straight path of the liquids lengthwise of the column.

According to the present invention, the extraction column is provided with a spiral ribbon formed in sections extending between perforated plates and from the interior of the column wall to a common center post to which the sections are secured for support.

Other objects will be apparent from the following description and drawings in which:

FIG. 1 is a diagrammatic view of the mixer-settler of the present invention; and FIG. 2 is a sectional view of a portion of the extraction column of the mixer settler with its novel spiral ribbon.

In the case in which the organic phase influent has a lower density than the aqueous phase influent, the apparatus of the present invention comprises a hollow cylindrical column 10, an inlet line 11 for aqueous phase at the top of the column, an outlet line 12 for the organic phase at the top of the column, an inlet line 13 for the organic phase at the bottom of the column, an outlet line 14 for the aqueous phase at the bottom of the column, a motor-operated bellows 15 for supplying pulses to liquid in the column, and a plurality of perforated plates 16 extending across the column in spaced relation to one another.

The present apparatus also has, as a novel feature, a spiral element 17 which extends along the column 10 throughout the region occupied by the perforated plates 16 and increases the length of the countercurrent contact between the phases in the column by making them follow a spiral path.

As shown in FIG. 2, the perforated plates 16 are held in spaced parallel relationship by being clamped between short tubular sections 18 mounted on a rod 19 extending along the axis of the column 10. The spiral element 17 comprises a plurality of spiral radial ribbon sections 20, each of which is welded or soldered at its inner edge to a tubular section 18 and has its outer edge immediately adjacent the inner surface of the column 10. The tubular sections 18 and the rod 19 extending through them may be considered to comprise a center post 21 to which the ribbon element 17 is secured. Each spiral section 20 extends from one perforated plate 16 to an adjacent plate 16. In the arrangement in FIG. 2, the end of each section 20 is spaced from the adjacent end of the next section by the perforated plate 16 lying between the two sections 20 and these ends of the two sections are generally coincident with one another, so that the spiral element 17, formed by the spiral sections 18, is generally continuous, being interrupted only by the perforated plates 16. The ribbon sections 20 may be held against rotational shifting by endwise clamping of the tubular sections 18 and the perforated plates 16.

In experiments carried out to test the inclusion of the spiral element 17 in the above apparatus, the column 10 had an internal diameter of 3″. Correlations were sought for the prediction of spiral-cartridge performance from the performance of a standard cartridge or, in other words, a cartridge with the same hole diameter for the perforated plates 16, percent free area therein, and distance therebetween, but without the spiral element 17. For the purpose of the experiments, the column 10 had near a midpoint in its length, an outlet line 22 for the aqueous phase.

Definitions of terms used

Cartridge—A longitudinal section of the apparatus comprising a perforated plate 16 and the portion of the column 10 extending between the said plate 16 and the next plate 16 above it.

Percent free area—That percent of the area of an equilateral triangle formed by connecting hole centers in the perforated plates 16, which is open because of the holes.

Pitch—The distance measured axially of the column 10 required for the spiral element 17 to go completely about the center post 21.

Amplitude—The vertical displacement of liquid within the column 10 measured from one extremity in a given cartridge to the other extremity in the same cartridge or in the cartridge below the given cartridge.

Flooding frequency—That frequency at which sufficient organic phase is rejected from the bottom of a cartridge to form an interface while the top interface position is maintained by adjustment of the bottom effluent stream.

Colburn Transfer Units—HTU, ft.—The height of a transfer unit in feet as explained in Industrial and Engineering Chemistry, vol. 33, No. 4, pages 459–467, April 1941. Thus the height of a column is obtained that is required for a given mass transfer.

Efficiency—The relative ability of a given extractor column to perform a given extraction as indicated by the HTU values. The improvement obtained with the new column is greater, when the HTU value and, thereby, the column height required for a given performance is smaller.

The aqueous phase of the test system contained uranyl nitrate and nitric acid. The organic phase contained 30% tributyl phosphate in kerosene diluent. Transfer of uranium from the aqueous phase to the organic phase was used to calculate efficiencies by Colburn's HTU values.

MASS TRANSFER STUDIES—SPIRAL PULSED COLUMN CARTRIDGE

| Run No. | Pulse Ampli- tude, In. | Pulse Freq., cycles per min. | Nom. Vol. Vel., gal./hr.- ft.² | Act. Vol. Vel. | Aq./Org. Flow Ratio | Stream Analysis, Average grams/liter ||||||| Pitch, in. | (Efficiency) Colburn Transfer Unit HTU, ft. Top 3 ft. |
| | | | | | | Org. In | Aq. In || Middle—Aq. Out || Bottom—Aq. Out || Org. Out | | |
| | | | | | | U | U | HNO₃ | U | HNO₃ | U | HNO₃ | U | | |
| 1 | .44 | 70 | 500 | 487 | .411 | .95 | 11.15 | 17.4 | .23 | 15 | .096 | 14 | 4.2 | 3 | .66 |
| 2 | .6 | 70 | 500 | 539 | .407 | .1 | 11.15 | 17.4 | .453 | 16.1 | .28 | 13.3 | 4.7 | No spiral | .81 |
| 3 | .35 | 70 | 500 | 524 | .428 | .039 | 11.3 | 18.0 | .22 | | .071 | | 5.0 | 2 | .73 |
| 4 | .5 | 65 | 500 | 507 | .395 | .011 | 11.2 | 21.1 | .17 | | .05 | | 4.25 | 6 | .67 |
| 5 | .44 | 65 | 500 | 529 | .381 | .019 | 11.25 | 19.6 | .02 | | .05 | | 4.4 | 3 | .50 |
| 6 | .6 | 65 | 500 | 513 | .375 | .0058 | | | .155 | | .073 | | | No Spiral | .67 |

From the above table it is concluded that the efficiency of a spiral cartridge is 25% better than the efficiency of a standard cartridge. A spiral pitch of 3″ to 4″ gave the optimum efficiency in the column 10 with an internal diameter of 3″. Spiral pitches of 2″, 3″, and 6″ were compared to the standard cartridge. In each case the perforated plates 16 were 2″ apart and had a hole diameter of 1/8″ and a 23% free area.

From these tests and other tests made but not reproduced here, it is concluded that:

Capacity of a spiral cartridge was equal to the capacity of a standard cartridge if the pulse amplitude in the spiral cartridge was 12 to 42 percent less than the amplitude in the standard cartridge.

Pulse amplitude (0.26 to 1.5 inches), flooding frequency (40 to 120 cycles per minute), sieve plate spacing (2 to 4 inches), sieve plate free area (10 to 42 percent), sieve plate hole diameter (1/16 to 3/16 inch), spiral pitch (2 to 6 inches) and aqueous to organic flow ratio (0.2 to 2.0) were studied. Increasing sieve plate spacing, hole diameter, or percent free area gave similar increases in capacity for the standard and the spiral cartridge. Decreasing spiral pitch decreased capacity for the same pulse amplitude. Changes in "aqueous-to-organic" flow ratio did not change capacity.

Pulse amplitude, flooding pulse frequency, and volume velocity were tested in a spiral cartridge and a standard cartridge. Perforated plates 16 were spaced two inches apart and each had a hole diameter of 1/8 inch and a 23 percent free area. Capacities or flooding frequencies of the spiral cartridge were approximately equal to the flooding frequencies of the standard cartridge if the spiral cartridge vertical amplitude was 58, 78, and 88 percent of the standard cartridge vertical amplitude for a spiral pitch of two, three and six inches, respectively.

Changing the plate spacing from two to four inches produced a 30 percent increase in the flooding frequency of a spiral cartridge at a volume velocity of 800 gal./hr.ft.². The flooding frequency of the standard cartridge was increased 15 percent for the same conditions. Changing the plate spacing from two to four inches did not change the flooding frequency of the spiral cartridge or the flooding frequency of the standard cartridge at a volume velocity of 200 gal./hr.ft.².

A change in sieve plate hole diameter from 1/16 to 3/16 inch did not change the flooding frequency of a spiral cartridge with a three-inch pitch. Volume velocities were 200 to 800 gal./hr. ft.². Free area of the sieve plates was 23 percent for all hole diameters. Plates were spaced two inches apart. Increasing the hole diameter from 1/16 to 3/16 inch produced a 20 percent increase in the flooding frequency of a standard cartridge at a volume velocity of 800 gal./hr.ft.².

Increasing the free area of the sieve plates from 10 to 23 percent exhibited up to a 50 percent increase in flooding frequencies for both a standard cartridge and a spiral cartridge with a three-inch pitch. Hole diameter of the sieve plates was 1/8 inch; spacing of the sieve plates was two inches. Changing the free area of the sieve plates from 23 to 42 percent produced up to a 25 percent increase in the flooding frequency of both the spiral cartridge and the standard cartridge.

In the present case the spiral pitch cannot be less than about 2″ because of the tendency of spiral channeling, that is, the gross countercurrent bypassing of aqueous and organic emulsion due to the "riding" of the organic phase on the spiral element 17. The disadvantage of unduly increasing the pitch of the spiral element 17 is, of course, apparent; there is no real reduction in the length of the column 10.

The intention is to limit the invention only within the scope of the appended claims.

What is claimed is:

1. A pulsed-column extraction apparatus, comprising a column, a plurality of equally spaced flat perforated plates perpendicular to the wall surface of said column each covering the cross-sectional area of said column, an organic-phase-ingress line and an aqueous-phase-egress line at one end of said column, an aqueous-phase-ingress line and an organic-phase-egress line at the other end thereof, liquid pulse means connected to said column, and an imperforate spiral ribbon along the length of said column, whereby the length of the path of the liquids is increased, said spiral ribbon being formed of spiral sections, each section of the ribbon extending only the distance between two adjacent perforated plates.

2. The apparatus of claim 1, and further comprising a center rod extending through the column, said perforated plates being mounted on said rod, a plurality of short tubular sections mounted on the rod and extending between the perforated plates, the spiral sections being secured at their inner edges to the tubular sections, and having outer edges at the inner surface of the column.

References Cited in the file of this patent

UNITED STATES PATENTS

| | | |
|---|---|---|
| 2,628,894 | Langmyhr | Feb. 17, 1953 |
| 2,808,318 | Feick | Oct. 1, 1957 |
| 2,852,349 | Hicks et al. | Sept. 16, 1958 |